(12) United States Patent
Bae et al.

(10) Patent No.: US 11,050,235 B2
(45) Date of Patent: Jun. 29, 2021

(54) SWITCH CONTROL CIRCUIT AND BATTERY PACK INCLUDING THE SAME

(71) Applicant: Samsung SDI Co., Ltd., Yongin-si (KR)

(72) Inventors: Jeongguk Bae, Yongin-si (KR); Giho Seo, Yongin-si (KR); Hyuncheol Jeon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 120 days.

(21) Appl. No.: 16/417,201

(22) Filed: May 20, 2019

(65) Prior Publication Data

US 2019/0362922 A1 Nov. 28, 2019

(30) Foreign Application Priority Data

May 28, 2018 (KR) .......................... 10-2018-0060518

(51) Int. Cl.
*H02H 1/04* (2006.01)
*H01H 47/00* (2006.01)
(Continued)

(52) U.S. Cl.
CPC ............ *H02H 1/04* (2013.01); *H01H 47/002* (2013.01); *H02H 3/027* (2013.01); *B60L 3/0084* (2013.01);
(Continued)

(58) Field of Classification Search
CPC ............ H02H 1/04; H02H 3/027; H02H 7/18; H01H 47/002; B60L 3/0023–0084; B60L 3/0092
See application file for complete search history.

(56) References Cited

U.S. PATENT DOCUMENTS

| | | | |
|---|---|---|---|
| 2006/0034030 A1* | 2/2006 | Andersen | H02H 9/025 361/118 |
| 2011/0310644 A1* | 12/2011 | Ogura | H02M 7/5387 363/55 |

(Continued)

FOREIGN PATENT DOCUMENTS

| | | |
|---|---|---|
| EP | 3 385 108 A1 | 10/2018 |
| KR | 10-2013-0084875 A | 7/2013 |

(Continued)

OTHER PUBLICATIONS

Extended European Search Report dated Oct. 17, 2019 for European Patent Application No. EP 19 177 086.6 which cites the above-identified references No. 1-3, and which shares priority of Korean Patent Application No. KR 10-2018-0060518 with subject U.S. Appl. No. 16/417,201.

(Continued)

*Primary Examiner* — Fred E Finch, III

(74) *Attorney, Agent, or Firm* — Knobbe, Martens, Olson & Bear, LLP

(57) ABSTRACT

A switch control circuit and a battery pack including the same are disclosed. The switch control circuit can include a first controller outputting a first control signal for controlling a driver, and a second controller configured to detect a fault of the first controller and to output a second control signal in response to detecting the fault of the first controller. The switch control circuit can further include first to third buffers each outputting an output signal corresponding to the first control signal or changing an output terminal of each buffer to an open state in response to the second control signal. The switch control circuit can further include a holding circuit holding a previous state of an input signal of the third buffer and a switch circuit transferring the output signal of the (Continued)

second buffer or the third buffer to the driver in response to the second control signal.

18 Claims, 11 Drawing Sheets

(51) Int. Cl.
  *H02H 3/027* (2006.01)
  *B60L 3/00* (2019.01)
  *H02H 7/18* (2006.01)
  *B60L 3/04* (2006.01)
(52) U.S. Cl.
  CPC .............. *B60L 3/0092* (2013.01); *B60L 3/04* (2013.01); *H02H 7/18* (2013.01)

(56) References Cited

U.S. PATENT DOCUMENTS

| | | | |
|---|---|---|---|
| 2012/0062158 A1 | 3/2012 | Itou | |
| 2012/0280572 A1* | 11/2012 | Li | ........................ H02J 7/0026 307/77 |
| 2013/0063114 A1* | 3/2013 | Agrawal | .................. H02M 1/38 323/283 |
| 2014/0042828 A1* | 2/2014 | Itagaki | .................. B60L 3/0046 307/130 |
| 2014/0092655 A1* | 4/2014 | Igarashi | .................. H02P 27/08 363/56.03 |
| 2016/0056001 A1 | 2/2016 | Sawano | |
| 2019/0097561 A1* | 3/2019 | Sato | ........................ H02M 7/48 |
| 2019/0326746 A1* | 10/2019 | Li | ........................ G01R 31/3835 |
| 2019/0334342 A1* | 10/2019 | Nam | ...................... H02H 5/041 |
| 2020/0124672 A1* | 4/2020 | Cho | .................... G01R 31/3842 |

FOREIGN PATENT DOCUMENTS

| | | |
|---|---|---|
| KR | 10-2017-0114827 A | 10/2017 |
| KR | 10-2018-0008224 A | 1/2018 |
| WO | WO 2018/012696 A1 | 1/2018 |

OTHER PUBLICATIONS

Examination report dated Apr. 12, 2012 in corresponding European patent application No. 19177086.6, 4 pp.

* cited by examiner

FIG. 4

| CS | L | H |
|---|---|---|
| SS1 | H | |
| First buffer output | L | H |
| Second buffer output | L | H |
| Third buffer output | | Z |
| Switch (205) output | L | H |

L : Low
H : High
Z : High impedance

FIG. 10

| | | |
|---|---|---|
| CS | L | H |
| SS1 | | H |
| SS2 | | H |
| First buffer output | L | H |
| Second buffer output | L | H |
| Third buffer output | L | H |
| Switch(Q1) output | | OFF |
| Switch(Q2) output | | ON |
| Switch(Q3) output | | ON |
| Driver input | L | H |

L : Low
H : High
Z : High impedance

FIG. 11

| | | Fault ↓ | | | |
|---|---|---|---|---|---|
| CS | H | | L | | |
| SS1 | H | | L | | |
| SS2 | | H | | L | |
| First buffer output | H | | Z | | |
| Second buffer output | H | | Z | | |
| Third buffer output | | H | | L | |
| Switch(Q1) | OFF | ON | | OFF | |
| Switch(Q2) | | ON | | OFF | |
| Switch(Q3) | | ON | | OFF | |
| | t21 | | t22 t23 t24 | | |

L : Low
H : High
Z : High impedance

SWITCH CONTROL CIRCUIT AND BATTERY PACK INCLUDING THE SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The described technology generally relates to a switch control circuit and a battery pack including the same.

Description of the Related Technology

Recently, according to strengthening of environmental regulations including CO2 regulations, interest in environmentally-friendly vehicles has been increasing. Accordingly, automotive companies have been actively researching and developing pure electrical vehicles and hydrogen vehicles as well as hybrid and plug-in hybrid vehicles.

A high voltage battery pack for storing electrical energy obtained from various energy sources is applied to the environmentally-friendly vehicles. A high voltage storage system of a vehicle uses high voltage electrical energy supplied from a high voltage battery for driving or electrical needs of the vehicle.

When output of the battery pack is suddenly cut off, e.g., due to a hardware or software malfunction while a vehicle is in motion, there is a risk of x-by-wire faults. In such instance, the driver may lose control of the vehicle, leading to an accident.

SUMMARY OF CERTAIN INVENTIVE ASPECTS

One inventive aspect is a switch control circuit, and a battery pack including the same, which can prevent an output of the battery pack from being suddenly cut off due to a temporary fault of the battery pack during operation in an environmentally friendly vehicle.

Another aspect is a switch control circuit including: a driver configured to control switching of a high voltage switch; a first controller configured to output a first control signal; a second controller configured to detect a fault of the first controller and to output a second control signal corresponding to a fault detection result of the first controller; a first buffer and a second buffer configured to output an output signal corresponding to the first control signal or make an output terminal open in response to the second control signal; a third buffer; a holding circuit configured to include a resistor connected between an output terminal of the first buffer and an output terminal of the third terminal and a capacitor connected between an input terminal and ground; and a switch circuit configured to transfer an output signal of the second buffer or the third buffer to the driver in response to the second control signal.

In the switch control circuit, the second controller may hold the second control signal at a first level when the first controller is operating normally and may change the second control signal to a second level when a fault of the first controller is detected.

In the switch control circuit, the first buffer and the second buffer may be three-state buffers, each of which includes an enable terminal to which the second control signal is applied, and an input terminal and an output terminal to which the first control signal is applied, to output an output signal corresponding to the first control signal when the second control signal has the first level and to make the output terminal open when the second control signal has the second level.

In the switch control circuit, the third buffer may be a three-state buffer including an enable terminal to which the second control signal is applied, an input terminal connected to the resistor, and an output terminal connected to the switch circuit, to output an output signal corresponding to an input signal when the second control signal has the second level and to make the output terminal open when the second control signal has the first level.

In the switch control circuit, the switch circuit may include a switch configured to include a first terminal connected to the driver, a second terminal connected to the output terminal of the second buffer, a third terminal connected to the output terminal of the third buffer, and a control terminal to which the second control signal is applied, and the switch may connect the first terminal to the second terminal when the second control signal has the first level, and may connect the first terminal to the third terminal when the second control signal has the second level.

In the switch control circuit, the third buffer may output an output signal corresponding to the input signal input through the holding circuit.

In the switch control circuit, the second controller may output a third control signal in response to a fault detection result of the first controller, and may change the third control signal to the second level at a predetermined time after the second control signal is changed to the second level when the fault of the first controller is detected.

In the switch control circuit, the switch circuit may include: a first switch configured to include a first terminal connected to the output terminal of the third buffer, a second terminal, and a control terminal to which the second control signal is applied, and that is turned on when the second control signal has the second level; and a second switch configured to include a first terminal connected to the output terminal of the second buffer and the second terminal of the first switch, and a second terminal connected to the driver, and that is turned on in response to the third control signal.

In the switch control circuit, the switch circuit may further include a third switch configured to include a first terminal connected to the control terminal of the second switch, a second terminal connected to the ground, and a control terminal, to connect the first terminal and the ground in response to the third control signal.

In the switch control circuit, the switch circuit may further include a delay circuit connected between the control terminal of the third switch and the second controller to transfer the third control signal, and the delay circuit may include a resistor connected between the second controller and the control terminal of the third switch, and a capacitor connected between the control terminal of the third switch and the ground.

In the switch control circuit, the switch circuit may further include a diode configured to include an anode connected to the second controller and a cathode connected to a control terminal of the third switch.

Another aspect is a battery pack including: a battery module; a high voltage switch connected between the battery module and an external device to control a current flow between the battery module and the external device; a driver configured to control switching of the high voltage switch; a first controller configured to output a first control signal; a second controller configured to detect a fault of the first controller and to output a second control signal corresponding to a fault detection result of the first controller; a first buffer and a second buffer configured to output an output signal corresponding to the first control signal or make an output terminal open in response to the second control signal; a third buffer; a holding circuit configured to include a resistor connected between an output terminal of the first buffer and an output terminal of the third terminal and a capacitor connected between an input terminal and ground; and a switch circuit configured to transfer an output signal of the second buffer or the third buffer to the driver in response to the second control signal.

In the battery pack, the second controller may hold the second control signal at a first level when the first controller is operating normally and may change the second control signal to a second level when a fault of the first controller is detected.

In the battery pack, the first buffer and the second buffer may be three-state buffers, each of which includes an enable terminal to which the second control signal is applied, and an input terminal and an output terminal to which the first control signal is applied, to output an output signal corresponding to the first control signal when the second control signal has the first level and to make the output terminal open when the second control signal has the second level.

In the battery pack, the third buffer may be a three-state buffer including an enable terminal to which the second control signal is applied, an input terminal connected to the resistor, and an output terminal connected to the switch circuit, to output an output signal corresponding to an input signal when the second control signal has the second level and to make the output terminal open when the second control signal has the first level.

In the battery pack, the switch circuit may include a switch configured to include a first terminal connected to the driver, a second terminal connected to the output terminal of the second buffer, a third terminal connected to the output terminal of the third buffer, and a control terminal to which the second control signal is applied, and the switch may connect the first terminal to the second terminal when the second control signal has a first level, and may connect the first terminal to the third terminal when the second control signal has a second level.

In the battery pack, the second controller may output a third control signal in response to a fault detection result of the first controller, and may change the third control signal to the second level at a predetermined time after the second control signal is changed to the second level when the fault of the first controller is detected.

In the battery pack, the switch circuit may include: a first switch configured to include a first terminal connected to the output terminal of the third buffer, a second terminal, and a control terminal to which the second control signal is applied, and that is turned on when the second control signal has the second level; a second switch configured to include a first terminal connected to the output terminal of the second buffer and the second terminal of the first switch, a second terminal connected to the driver, and a control terminal; and a third switch configured to include a first terminal connected to the control terminal of the second switch, a second terminal connected to the ground, and a control terminal, to connect the first terminal and the ground in response to the third control signal.

In the battery pack, the switch circuit may further include: a delay circuit configured to include a resistor connected between the second controller and the control terminal of the third switch, and a capacitor connected between the control terminal of the third switch and the ground; and a diode configured to include an anode connected to the second controller and a cathode connected to a control terminal of the third switch.

Another aspect is a switch control circuit comprising: a driver configured to control switching of a high voltage switch; a first controller configured to output a first control signal for controlling the driver; a second controller electrically connected to the first controller and configured to detect a fault of the first controller and to output a second control signal in response to detecting the fault of the first controller; a first buffer, a second buffer and a third buffer each configured to output an output signal, via an output terminal thereof, corresponding to the first control signal or change the respective output terminal to an open state in response to the second control signal; a holding circuit including a resistor connected between the output terminal of the first buffer and the output terminal of the third buffer and a capacitor connected between an input terminal of the third buffer and ground; and a switch circuit configured to transfer the output signal of the second buffer or the output signal of the third buffer to the driver in response to the second control signal.

In the above switch control circuit, the second controller is configured to hold the second control signal at a first level when the first controller is operating normally, and change the second control signal to a second level different from the first level when a fault of the first controller is detected. In the above switch control circuit, the first buffer and the second buffer are three-state buffers, each of which includes an enable terminal to which the second control signal is applied, an input terminal and the output terminal thereof to which the first control signal is applied, to output the output signal corresponding to the first control signal when the second control signal has the first level and to change the output terminal of each of the first and second buffers to an open state when the second control signal has the second level.

In the above switch control circuit, the third buffer is a three-state buffer including an enable terminal to which the second control signal is applied, the input terminal connected to the resistor, and the output terminal thereof connected to the switch circuit, to output the output signal corresponding to an input signal of the third buffer when the second control signal has the second level and to change the output terminal of the third buffer to an open state when the second control signal has the first level. In the above switch control circuit, the switch circuit includes a switch including (i) a first terminal connected to the driver, (ii) a second terminal connected to the output terminal of the second buffer, (iii) a third terminal connected to the output terminal of the third buffer, and (iv) a control terminal to which the second control signal is applied, and the switch is configured to connect the first terminal to the second terminal when the second control signal has the first level, and connect the first terminal to the third terminal when the second control signal has the second level.

In the above switch control circuit, the third buffer is configured to output the output signal thereof corresponding to the input signal of the third buffer input through the holding circuit. In the above switch control circuit, the second controller is configured to output a third control signal in response to a fault detection result of the first controller, and change the third control signal to the second level at a predetermined time after the second control signal is changed to the second level when the fault of the first controller is detected.

In the above switch control circuit, the switch circuit includes: a first switch configured to include a first terminal connected to the output terminal of the third buffer, a second terminal, and a control terminal to which the second control signal is applied, the first switch configured to be turned on when the second control signal has the second level; and a second switch including a first terminal connected to the output terminal of the second buffer and the second terminal of the first switch, and a second terminal connected to the driver, the second switch configured to be turned on in response to the third control signal.

In the above switch control circuit, the switch circuit further includes a third switch including a first terminal connected to the control terminal of the second switch, a second terminal connected to the ground, and a control terminal, to connect the first terminal and the ground in response to the third control signal. In the above switch control circuit, the switch circuit further includes a delay circuit connected between the control terminal of the third switch and the second controller to transfer the third control signal, and the delay circuit includes a resistor connected between the second controller and the control terminal of the third switch, and a capacitor connected between the control terminal of the third switch and the ground. In the above switch control circuit, the switch circuit further includes a diode including an anode connected to the second controller and a cathode connected to a control terminal of the third switch.

Another aspect is a battery pack comprising: a battery module; a high voltage switch connected between the battery module and an external device to control a current flow between the battery module and the external device; a driver configured to control switching of the high voltage switch; a first controller configured to output a first control signal for controlling the driver; a second controller electrically connected to the first controller and configured to detect a fault of the first controller and to output a second control signal in response to detecting the fault of the first controller; a first buffer, a second buffer and a third buffer each configured to output an output signal, via an output terminal thereof, corresponding to the first control signal or change the respective output terminal to an open state in response to the second control signal; a holding circuit including a resistor connected between the output terminal of the first buffer and the output terminal of the third buffer and a capacitor connected between an input terminal of the third buffer and ground; and a switch circuit configured to transfer the output signal of the second buffer or the output signal of the third buffer to the driver in response to the second control signal.

In the above battery pack, the second controller is configured to hold the second control signal at a first level when the first controller is operating normally and change the second control signal to a second level when a fault of the first controller is detected. In the above battery pack, the first buffer and the second buffer are three-state buffers, each of which includes an enable terminal to which the second control signal is applied, and an input terminal and the output terminal thereof to which the first control signal is applied, to output the output signal corresponding to the first control signal when the second control signal has the first level and to change the output terminal of each of the first and second buffers to an open state when the second control signal has the second level.

In the above battery pack, the third buffer is a three-state buffer including an enable terminal to which the second control signal is applied, an input terminal connected to the resistor, and the output terminal thereof connected to the switch circuit, to output the output signal corresponding to an input signal of the third buffer when the second control signal has the second level and to change the output terminal of the third buffer to an open state when the second control signal has the first level.

In the above battery pack, the switch circuit includes: a first switch including a first terminal connected to the output terminal of the third buffer, a second terminal, and a control terminal to which the second control signal is applied, the first switch configured to be turned on when the second control signal has the second level; a second switch including a first terminal connected to the output terminal of the second buffer and the second terminal of the first switch, a second terminal connected to the driver, and a control terminal; and a third switch including a first terminal connected to the control terminal of the second switch, a second terminal connected to the ground, and a control terminal, to connect the first terminal and the ground in response to the third control signal.

In the above battery pack, the switch circuit further includes: a delay circuit including a resistor connected between the second controller and the control terminal of the third switch, and a capacitor connected between the control terminal of the third switch and the ground; and a diode including an anode connected to the second controller and a cathode connected to a control terminal of the third switch.

Another aspect is a battery pack comprising: a battery module; a high voltage switch connected between the battery module and an external device to control a current flow between the battery module and the external device; a driver configured to control switching of the high voltage switch; a main controller configured to output a first control signal for controlling the driver; an auxiliary controller electrically connected to the main controller and configured to detect a fault of the main controller and to output a second control signal in response to detecting the fault of the main controller; at least two buffers comprising a holding circuit input buffer and a holding circuit output buffer each configured to output an output signal, via an output terminal thereof, corresponding to the first control signal or change the respective output terminal to an open state in response to the second control signal; a holding circuit connected between the output terminal of the holding circuit input buffer and the output terminal of the holding circuit output buffer and configured to hold a previous state of an input signal of the holding circuit output buffer during a predetermined time when the output terminal of the holding circuit input buffer is switched to the open state; and a switch circuit connected between i) the holding circuit output buffer and ii) the auxiliary controller and the driver.

In the above battery pack, the holding circuit includes a resistor connected between the output terminal of the holding circuit input buffer and the output terminal of the holding circuit output buffer and a capacitor connected between an input terminal of the holding circuit output buffer and ground. The above battery pack further comprises a holding circuit bypass buffer configured to output an output signal, via an output terminal thereof, corresponding to the first control signal or change the output terminal of the second buffer to an open state in response to the second control signal, wherein the switch circuit is configured to transfer the output signal of the holding circuit bypass buffer or the output signal of the holding circuit output buffer to the driver in response to the second control signal.

Another aspect is a switch control circuit for a battery module, comprising: a switch circuit configured to control a current flow between the battery module and an external device; a holding circuit input buffer configured to selectively receive a first control signal or a second control signal configured to selectively control the switch circuit; a holding circuit output buffer directly connected to the switch circuit; and a holding circuit connected between the holding circuit input buffer and the holding circuit output buffer, and configured to hold a previous state of an input signal to the holding circuit output buffer.

The above switch control circuit further comprises a holding circuit bypass buffer directly connected to the switch circuit and configured to selectively receive and selectively output the first control signal or the second control signal to the switch circuit.

According to at least one of the disclosed embodiments, it is possible to improve safety by preventing an output of the battery pack from being suddenly cut off due to a temporary fault of the battery pack during operation in an environmentally friendly vehicle.

BRIEF DESCRIPTION OF THE DRAWINGS

FIG. 4 to FIG. 6 illustrate views for describing an operating method in a state where a controller operates normally in the switch control circuit according to the first embodiment of the described technology.

FIG. 10 illustrates a view for describing an operating method in a state where a controller operates normally in the switch control circuit according to the second embodiment of the described technology.

FIG. 11 illustrates a view for describing an operating method in a state where the controller is faulty in the switch control circuit according to the second embodiment of the described technology.

DETAILED DESCRIPTION OF CERTAIN INVENTIVE EMBODIMENTS

Figure 1:
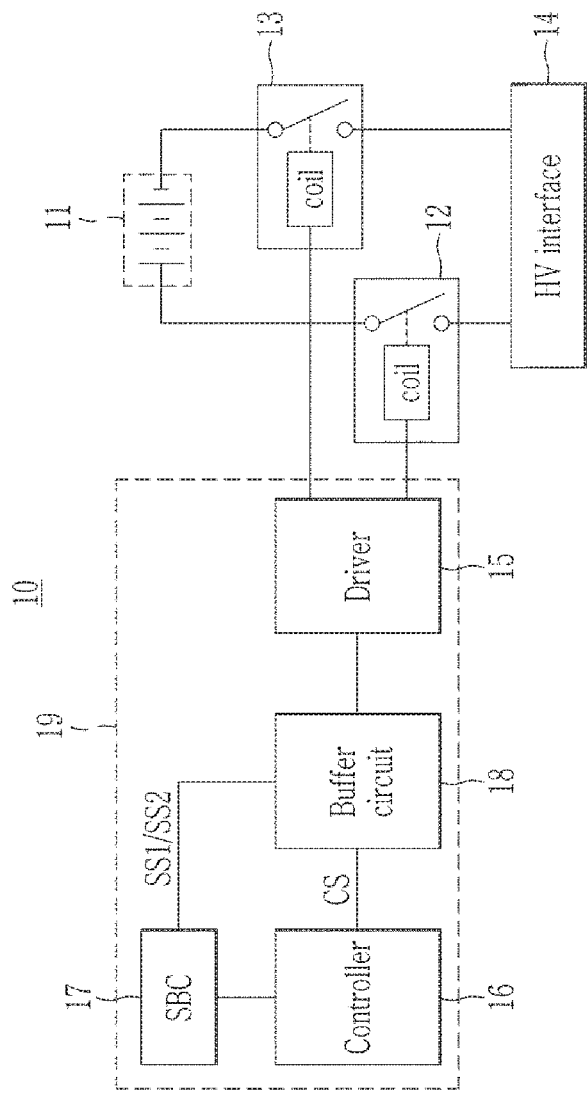
FIG. 1 schematically illustrates a battery pack according to some embodiments of the described technology.

The described technology will be described more fully hereinafter with reference to the accompanying drawings, in which exemplary embodiments of the invention are shown. As those skilled in the art would realize, the described embodiments may be modified in various different ways, all without departing from the spirit or scope of the described technology.

To clearly describe the exemplary embodiments, parts that are irrelevant to the description are omitted, and like numerals refer to like or similar constituent elements throughout the specification. Therefore, the reference numbers of the constituent elements used in a previous drawing may be used in a next drawing.

Further, since sizes and thicknesses of constituent members shown in the accompanying drawings are arbitrarily given for better understanding and ease of description, the exemplary embodiments are not limited to the illustrated sizes and thicknesses. In the drawings, the thickness of layers, films, panels, regions, etc., are exaggerated for clarity.

A case of electrically connecting two constituent elements includes not only a case of directly connecting the constituent elements but also a case of connecting the constituent elements via another constituent element therebetween. The constituent element therebetween may include a switch, a resistor, a capacitor, and the like. In describing exemplary embodiments, an expression of connection indicates electrical connection unless explicitly described to be direct connection.

Hereinafter, a switch control circuit and a battery pack including the same according to an exemplary embodiment will be described with reference to the drawings.

FIG. 1 schematically illustrates a battery pack according to some embodiments of the described technology. FIG. 1 is merely an example block diagram of the battery pack, and certain elements may be removed, other elements added, two or more elements combined or one element can be separated into multiple elements depending on the specification and requirements. This applies to FIGS. 2-3, 5-6 and 8-9.

Referring to FIG. 1, a battery pack 10 includes a battery module 11, a plurality of high voltage switches 12 and 13, and a high voltage (HV) interface 14.

The battery module 11 may include a plurality of cells connected in series or in parallel.

The high voltage switches 12 and 13 may be respectively connected between opposite terminals of the battery module 11 and the high voltage interface 14 to block or allow a current flow between the battery module 11 and the high voltage interface 14.

The high voltage interface 14 may be connected between the battery module 11 and an external device (e.g., a charging device, a load, etc.) (not shown) to perform a connection function between the battery module 11 and the external device.

The high voltage switches 12 and 13 may be switches that are robust against a high voltage and a high current, such as a relay and a contactor. Each of the high-voltage switches 12 and 13 may include a coil for switching operation, to be opened and closed by a contact that is operated depending on a voltage applied to the coil.

The battery pack 10 may further include a switch control circuit 19 configured to control opening and closing of the high voltage switches 12 and 13. The switch control circuit 19 may include a driver 15, a controller (to be interchangeably used with a first controller or a main controller) 16, a system basis chip (SBC) 17, and a buffer circuit 18.

The driver 15 may control switching (opening and closing) of each of the high voltage switches 12 and 13. For example, referring to FIG. 1, the driver 15 may control the switching of the high voltage switches 12 and 13 by switching a control voltage applied to the coil of each of the high voltage switches 12 and 13 depending on an input control signal.

The controller 16 may apply a control signal CS to the driver 15, may output the control signal CS configured to control the driver 15 based on, for example, status information of the battery module 11, vehicle status information, a vehicle driving mode, etc.

The system basis chip (SBC) 17 can be implemented with an integrated circuit. The SBC 17 can include, but is not limited to, one or more of a voltage regulator, a supervision function, a reset generator, a watchdog function, a bus interface, or a wake-up logic.

The SBC 17 may detect a fault of the controller 16. To this end, the SBC 17 may continuously communicate data with the controller 16 to determine the fault of the controller 16 based on a communication state with the controller 16. In addition, the SBC 17 may periodically receive an error detection signal from the controller 16 to detect the fault of the controller 16, so as to determine the fault of the controller 16 depending on a receipt state of an error detection signal (whether it is received, a pulse width, a receipt cycle, etc.).

The SBC 17 may operate as an auxiliary controller (or a second controller) configured to control the driver 15 on behalf of the controller 16 when the fault of the controller 16 is detected. The SBC 17 outputs safety signals SS1 and SS2 configured to control the buffer circuit 18, to change levels of the safety signals SS1 and SS2 depending on the detection of the fault of the controller 16. For example, when the controller 16 is operating normally, the levels of the safety signals SS1 and SS2 may be held at a high level, and when the fault of the controller 16 is detected, the levels of the safety signals SS1 and SS2 may be changed to a low-level. In other embodiments, when the controller 16 is operating normally, the levels of the safety signals SS1 and SS2 may be held at a low-level, and when the fault of the controller 16 is detected, the levels of the safety signals SS1 and SS2 may be changed to a high level.

The buffer circuit 18 may directly transfer the safety signals SS1 and SS2 received from the SBC 17, to the driver 15, or may control a control signal that is input into the driver 15 to be held in a previous state, in response to the safety signals SS1 and SS2 received from the SBC 17.

In this disclosure, the case where a control signal to be transferred from the SBC 17 to the buffer circuit 18 when the fault of the controller 16 is detected is the safety signal SS1 or SS2 is described as an example, but the described technology is not limited thereto. According to another exemplary embodiment, the control signal transmitted from the SBC 17 to the buffer circuit 18 when the fault of the controller 16 is detected may be a reset signal configured to reset the controller 16. In this case, the reset signal may be transferred directly from the SBC 17 to the buffer circuit 18, or may be transferred through the controller 16.

Hereinafter, the switch control circuit 19 according to a first exemplary embodiment of the described technology will be described in detail with reference to FIG. 2 to FIG. 8.

Figure 2:
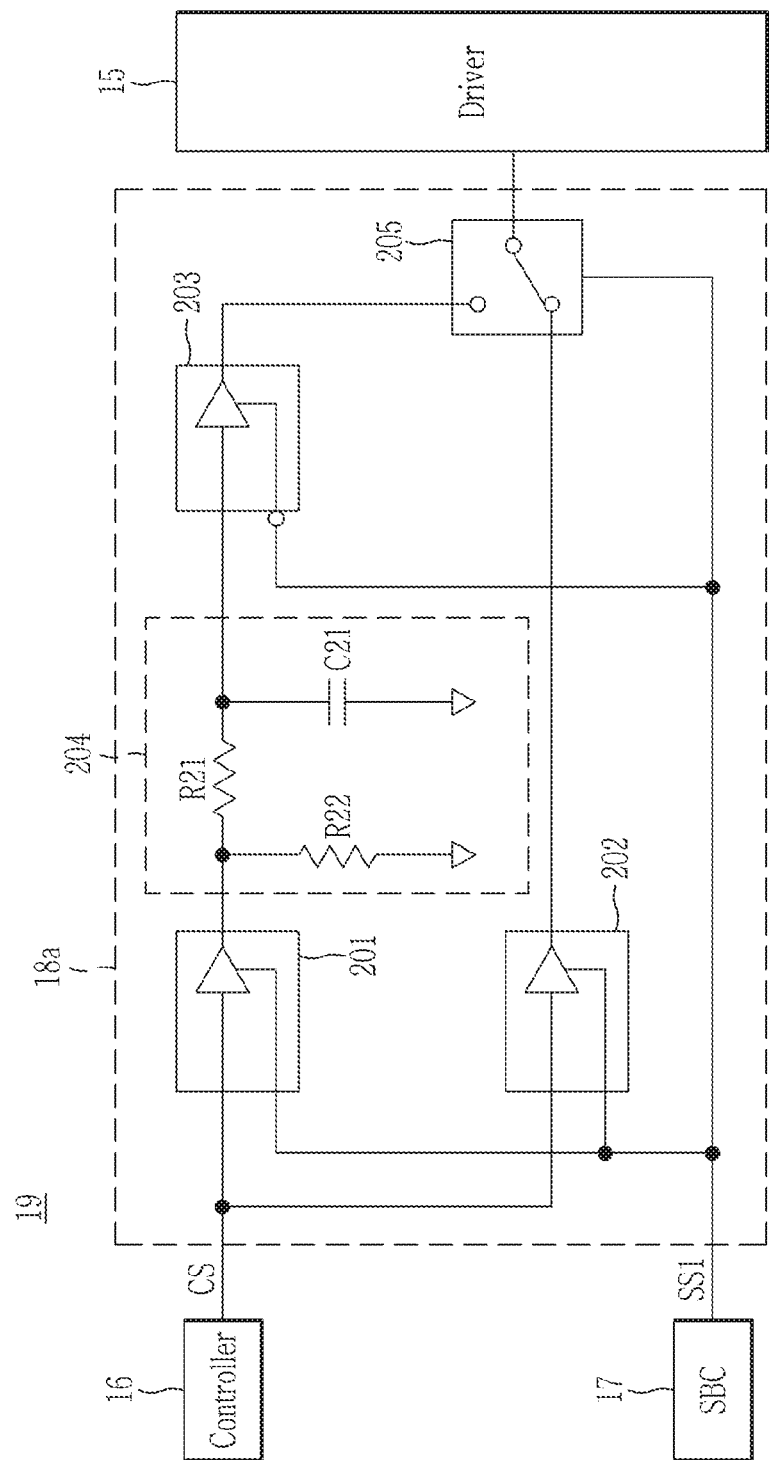
FIG. 2 schematically illustrates a switch control circuit according to a first embodiment of the described technology.
Figure 3:
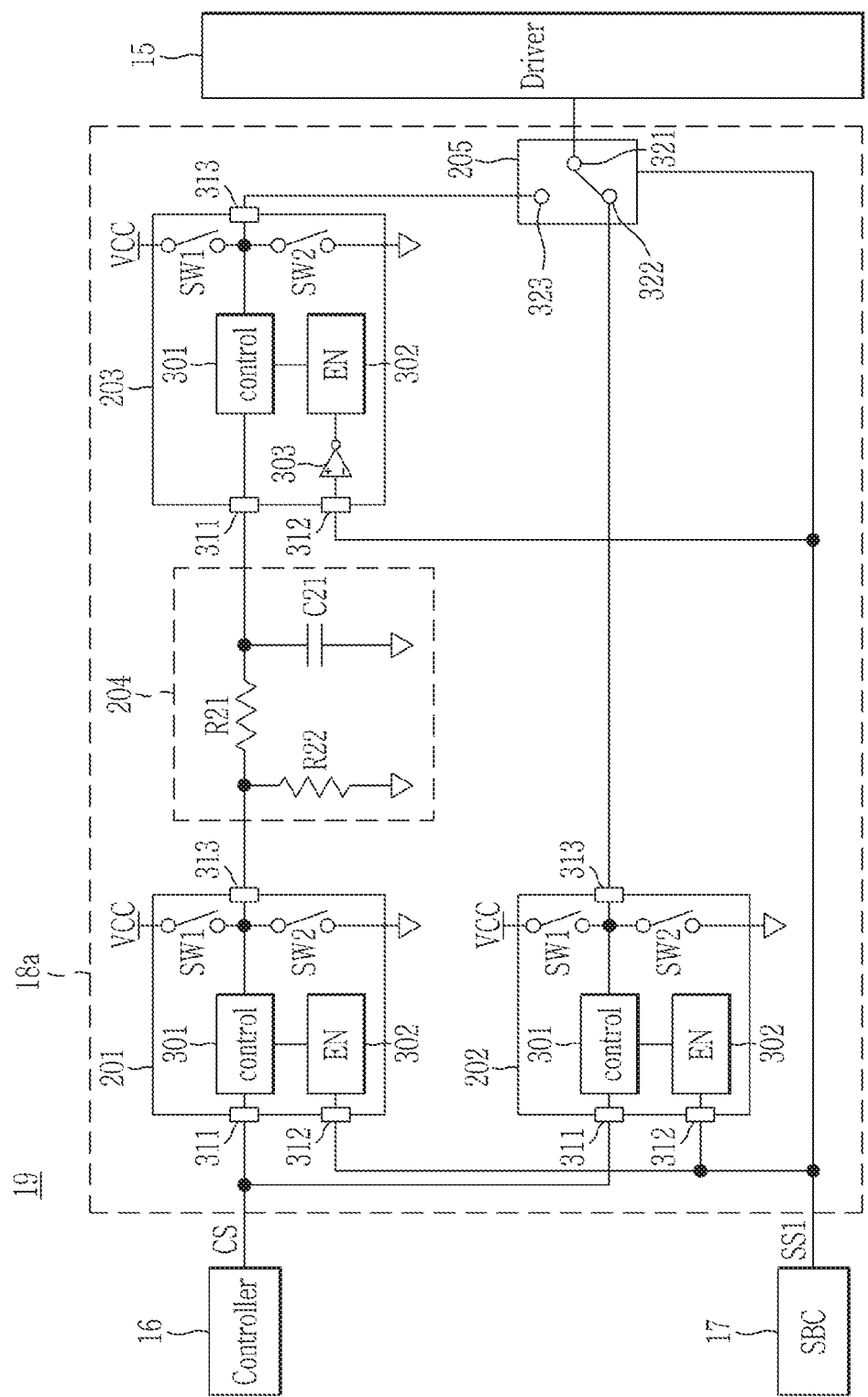
FIG. 3 illustrates the switch control circuit according to the first embodiment of the described technology in detail.

FIG. 2 schematically illustrates a switch control circuit 19 according to the first embodiment of the described technology, and FIG. 3 illustrates a detailed circuit diagram of the switch control circuit of FIG. 2 according to some embodiments.

Referring to FIG. 2 and FIG. 3, the switch control circuit 19 according to the first embodiment includes the driver 15, the controller 16, the SBC 17, and a buffer circuit 18*a*. The buffer circuit 18*a* corresponds to the buffer circuit 18 of FIG. 1, and may include a plurality of buffers 201, 202 and 203, a holding circuit 204, and a switch circuit (switch) 205.

Each of the buffers 201, 202, and 203 (hereinafter to be interchangeably used with first, second and third buffers, or a holding circuit input buffer, a holding circuit bypass buffer and a holding circuit output buffer) may include a 3-state buffer including an input terminal 311, an enable terminal 312, and an output terminal 313. Each of the buffers 201, 202, and 203 may output an output signal to the output terminal 313 to correspond to a control signal applied to the input terminal 311, or may change the output terminal to an open state, depending on a signal applied to the enable terminal 312.

Referring to FIG. 3, each of the buffers 201, 202, and 203 includes a first switch SW1 connected between a power terminal VCC and the output terminal 313, a second switch SW2 connected between the output terminal 313 and a ground, a control circuit 301 connected to the input terminal 311, and an enable circuit 302 connected to the enable terminal 312.

The first and second switches SW1 and SW2 may output a VCC voltage or a ground voltage to the output terminal 313 under the control of the control circuit 301, or may hold the open state. When both the first and second switches SW2 are open, the output terminal 313 is in a high impedance state (high impedance).

The control circuit 301 may control the first and second switches SW1 and SW2 depending on the control of the enable circuit 302 and the control signal input into the input terminal 311. For example, when a high-level control signal is input through the input terminal 311 in a state that is enabled by the enable circuit 302, the control circuit 301 may control the first switch SW1 to be closed and the second switch SW2 to be opened such that a high-level signal (VCC voltage) is output to the output terminal 313. For example, when a control signal of a low-level is input through the input terminal 311 in a state that is enabled by the enable circuit 302, the control circuit 301 may control the first switch SW1 to be opened and the second switch SW2 to be closed such that a low-level signal (ground voltage) is output to the output terminal 313. For example, when disabled by the enable circuit 302, the control circuit 301 may hold the open state of the first and second switches SW1 and SW2 regardless of the level of the control signal CS applied to the input terminal 311.

The enable circuit 302 may enable or disable the control circuit 301 depending on the control signal SS1 applied to the enable terminal 312.

In the first and second buffers 201 and 202, the enable circuit 302 may enable the control circuit 301 when the control signal SS1 has a high-level and may disable the control circuit 301 when the control signal SS1 has a low-level.

In the third buffer 203, an inverter 303 is disposed between the enable circuit 302 and the enable terminal 312 such that an inverted signal of the control signal SS1 may be input into the enable circuit 302. Accordingly, the enable circuit 302 of the third buffer 203 may enable the control circuit 301 when the control signal SS1 has the low-level and may disable the control circuit 301 when the control signal SS1 has the high-level.

The holding circuit 204 may serve to hold a previous state of a signal applied to the input terminal 311 of the third buffer 203 during a predetermined time when the output terminal 313 of the first buffer 201 is switched to the open state. The holding circuit 204 may include a resistor R21 connected between the output terminal 313 of the first buffer 201 and the input terminal 311 of the third buffer 203, and a capacitor C21 connected between the input terminal 311 of the third buffer 203 and the ground. The holding circuit 204 may further include a resistor R21 connected between the output terminal 313 of the first buffer 201 and the ground, as illustrated in FIG. 2 and FIG. 3.

When the output terminal 313 of the first buffer 201 is switched to the open state, the capacitor C21 of the holding circuit 204 may be delayed so that the state of the control signal input into the input terminal 311 of the third buffer 203 is gradually changed through charging and discharging. For example, when the output terminal 313 of the first buffer 201 outputs a high-level signal and is switched to the open state, the holding circuit 204 may hold the control signal input into the input terminal 311 of the third buffer 203 at a high-level (at which the control circuit 301 of the third buffer 203 closes the first switch SW1) for a predetermined time. For example, when the output terminal 313 of the first buffer 201 outputs a low-level signal and is switched to the open state, the holding circuit 204 may hold the control signal input into the input terminal 311 of the third buffer 203 at a low-level (at which the control circuit 301 of the third buffer 203 closes the second switch SW2) for a predetermined time.

A time during which the holding circuit 204 holds the level of the control signal input into the input terminal 311 of the third buffer 203 to the previous state when the output terminal 313 of the first buffer 201 is switched to the open state may be adjusted depending on RC time constants of the resistors R21 and R22 and the capacitor C21 constituting the holding circuit 204, and the RC time constants may vary depending on capacitances of the resistors R21 and R22 and the capacitor C21.

The switch 205 can be a single pole double throw (SPDT). The switch 205 may include a first terminal 321 connected to an input terminal of the driver 15, a second terminal 322 connected to the output terminal 313 of the second buffer 202, a third terminal 323 connected to the output terminal 313 of the third buffer 203, and a control terminal into which the safety signal SS1 is input from the SBC 17. The switch 205 may electrically connect the first terminal to either the second terminal or the third terminal depending on the safety signal SS1 that is input into the control terminal.

Hereinafter, the operation of the switch control circuit 19 according to the first embodiment will be described in detail with reference to FIG. 4 to FIG. 8.

Figure 5:
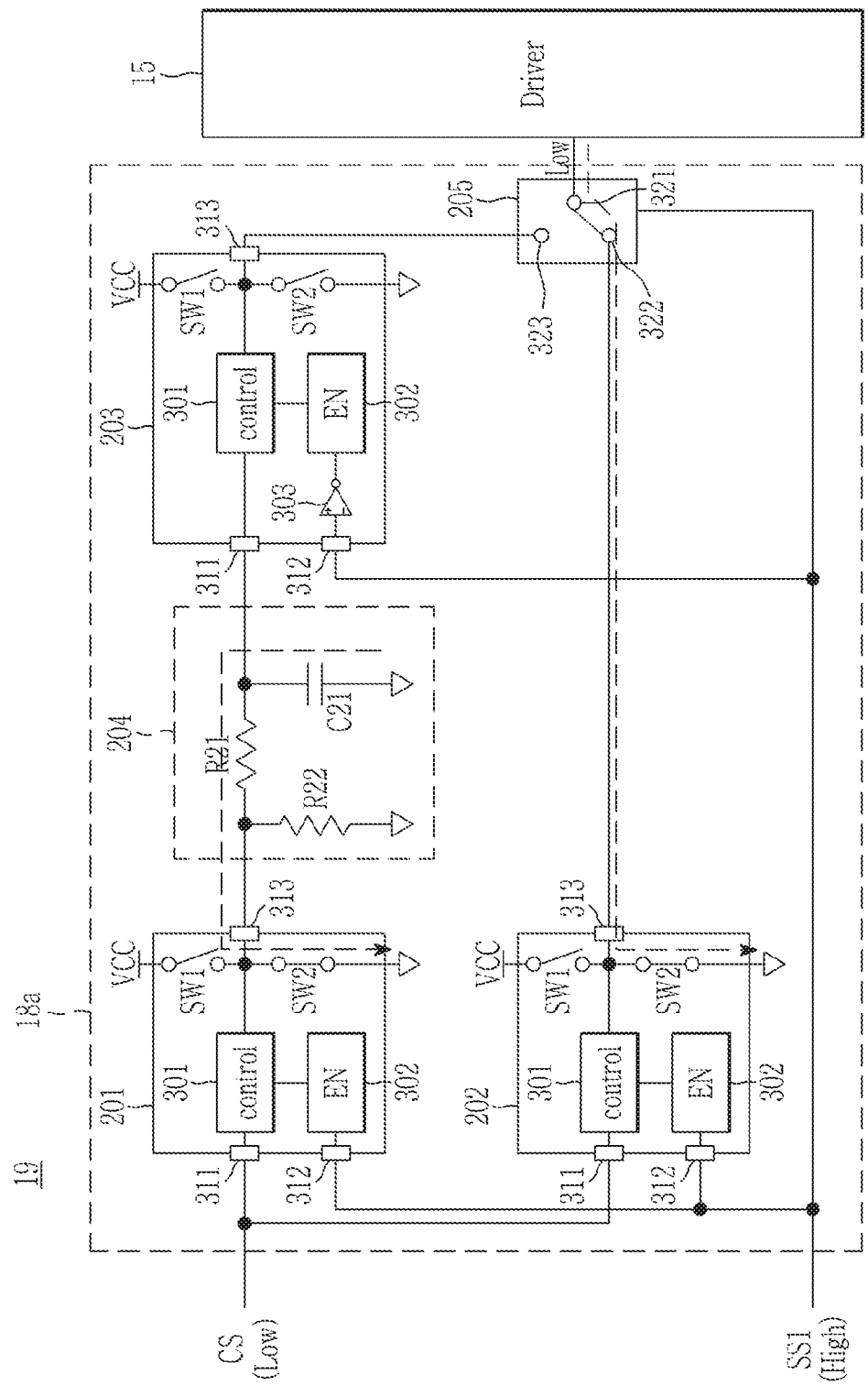
Figure 6:
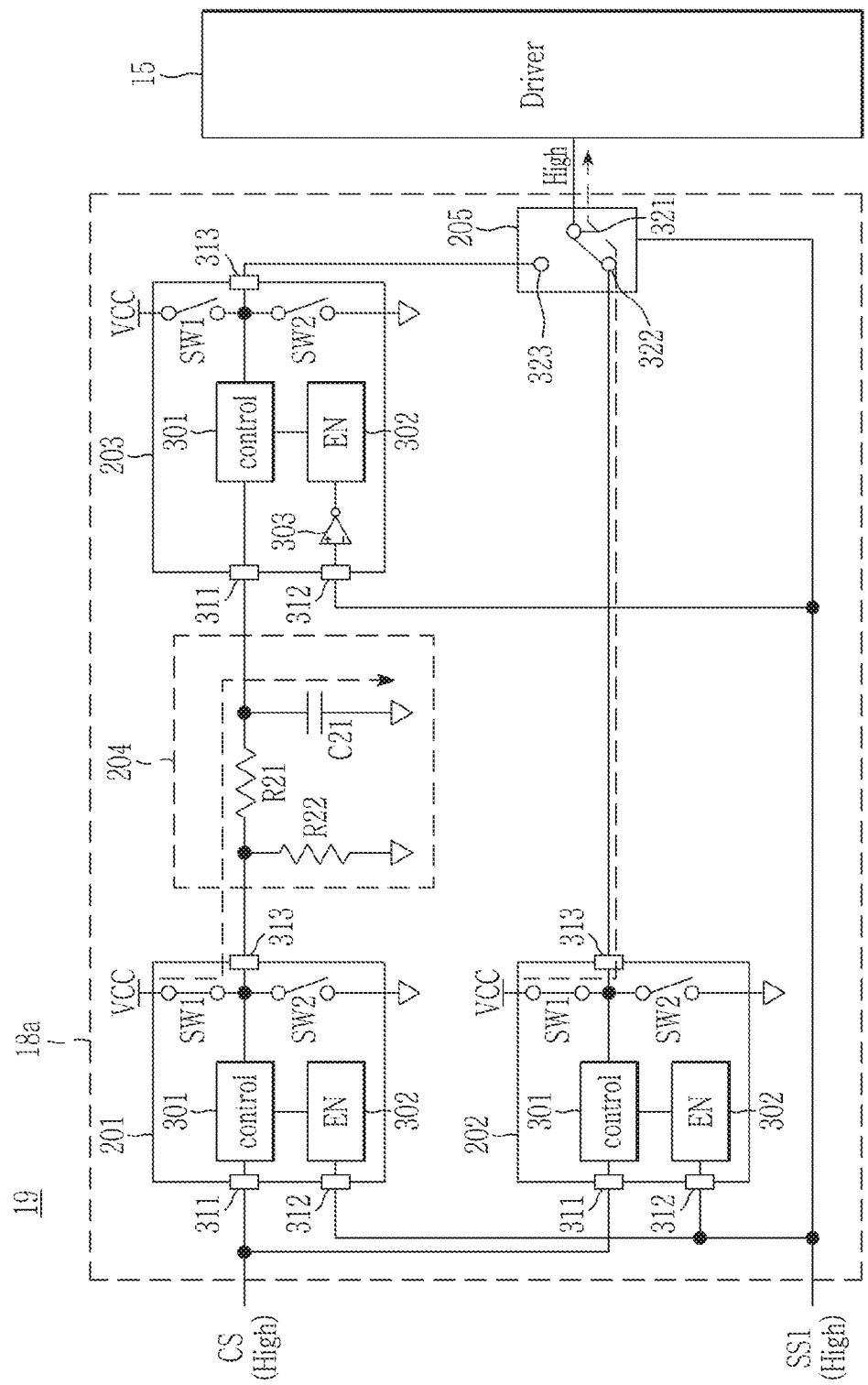

FIG. 4 to FIG. 6 illustrate views for describing an operating method in a state where a controller operates normally in the switch control circuit 19 according to the first embodiment.

Referring to FIG. 4 to FIG. 6, the safety signal SS1 output from the SBC 17 is held at the high-level in a state in which the controller 16 operates normally.

When the control signal SS1 has the high-level, the first and second buffers 201 and 202 are enabled to output an output signal in response to the control signal CS input from the controller 16. For example, referring to FIG. 5, the first and second buffers 201 and 202 output the output signal of a low-level (ground voltage) to the output terminal 313 as the control signal CS of a low-level is input from the controller 16. For example, referring to FIG. 6, the first and second buffers 201 and 202 output the output signal of a high-level (VCC voltage) to the output terminal 313 as the control signal CS of a high-level is input from the controller 16.

In a state where the safety signal SS1 has the high-level, the output signal of the first buffer 201 is transferred to the input terminal 311 of the third buffer 203, and the output signal of the second buffer 202 is transferred to the second terminal 322 of the switch 205. Further, in a state in which the safety signal SS1 has the high-level, the third buffer 203 is disabled to switch the output terminal 313 to the open state.

In the state in which the safety signal SS1 has the high-level, the first terminal 321 of the switch 205 is electrically connected with the second terminal 322. The control signal CS output from the controller 16 is transferred to the driver 15 through the second buffer 202 and the switch 205.

Figure 7:
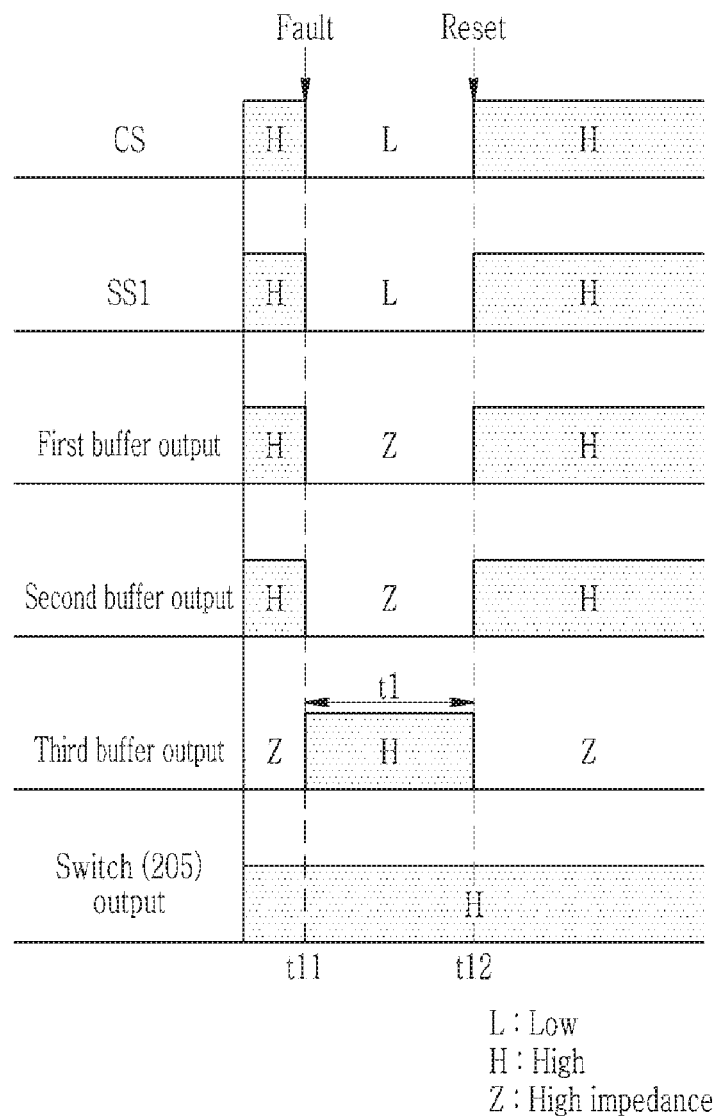
FIG. 7 and FIG. 8 illustrate views for describing an operating method in a state where the controller is faulty in the switch control circuit according to the first embodiment of the described technology.
Figure 8:
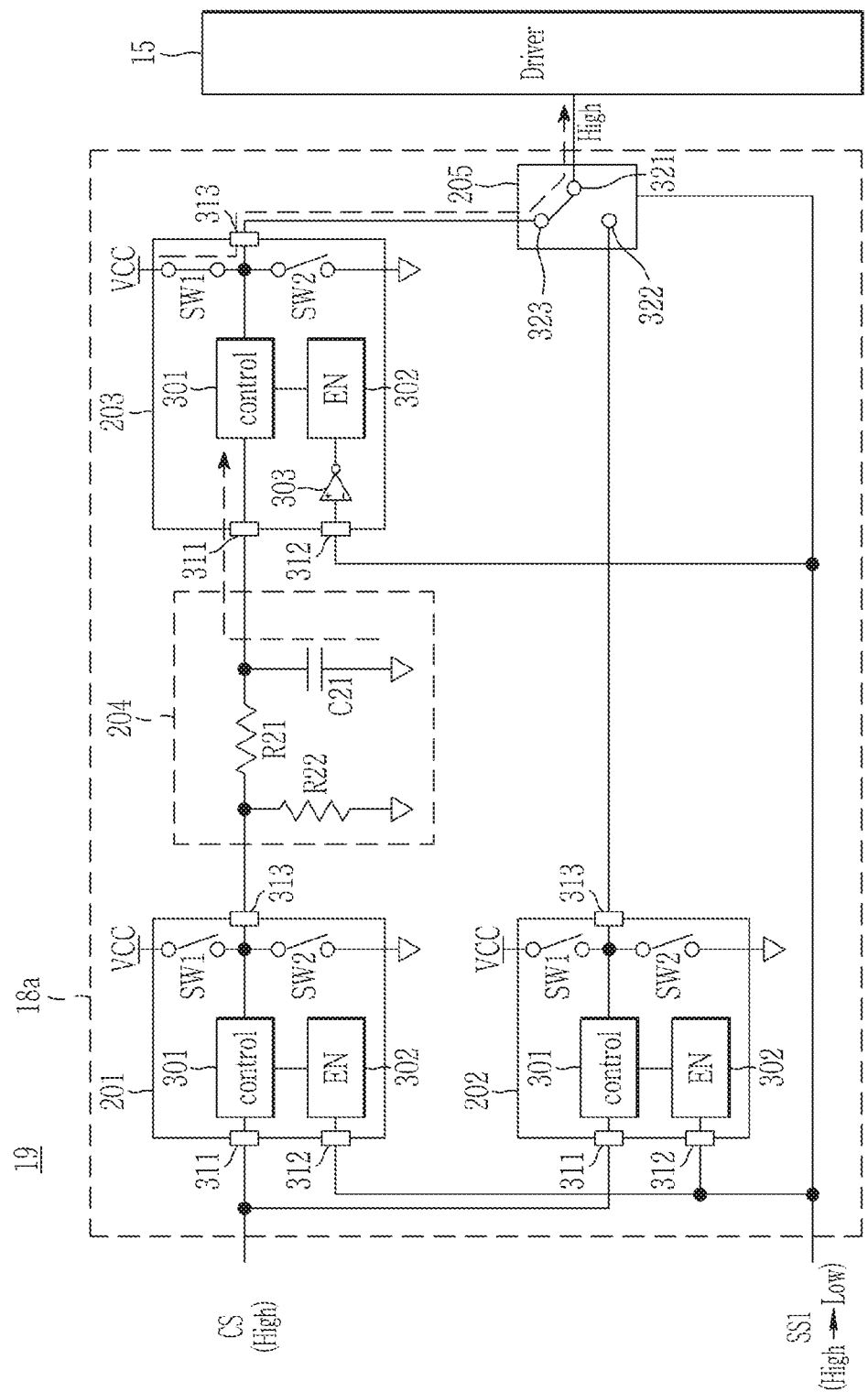

FIG. 7 and FIG. 8 illustrate views for describing an operating method in a state where the controller is faulty in the switch control circuit according to the first exemplary embodiment of the described technology.

Referring to FIG. 7 and FIG. 8, the SBC 17 changes the safety signal SS1 from the high-level to the low-level (time point t11 in FIG. 7) as the fault of the controller 16 is detected.

The first and second buffers 201 and 202 are disabled to switch the output terminal to the open state regardless of the control signal CS of the controller 16 as the safety signal SS1 is changed from the high-level to the low-level. In contrast, the third buffer 203 is enabled to output the output signal in response to the signal input into the input terminal 311.

The control signal CS output from the controller 16 before the fault occurs has the high-level, and thus the output signal of the first buffer 201 before the fault occurs also has the high-level. Therefore, the holding circuit 204 may hold the level of the signal input into the input terminal 311 of the third buffer 203 at a high-level by discharging a charge stored in the capacitor C21 during a normal operation, for a predetermined time (a period t11 to t12 in FIG. 7) after the first buffer 201 is disabled. Accordingly, the third buffer 203 may output the output signal of the high-level for the predetermined time.

While the safety signal SS1 has the low-level, the output signal of the third buffer 203 is transferred to the third terminal 323 of the switch 205, and the first terminal 321 of the switch 205 is electrically conducted to the third terminal 323. As a result, as illustrated in FIG. 7, even in a state where the control signal CS is changed to the low-level due to the fault of the controller 16, the control signal input into the driver 15 may be held at the high-level which is the level of the control signal CS output from the controller 16 before the fault occurs, for a predetermined time (a period t11 to t12 in FIG. 7).

The SBC 17 outputs a reset signal to the controller 16 to restart the controller 16 when the fault of the controller 16 is detected. Therefore, as described above, when the control signal input to the driver 15 is held in the previous state until the controller 16 restarts to output the normal control signal CS (a time point t12 in FIG. 7), the output of the battery pack (see reference numeral 10 in FIG. 1) may be prevented from being suddenly cut off, thereby ensuring safety.

Hereinafter, the switch control circuit 19 according to a second embodiment of the described technology will be described in detail with reference to FIG. 9 to FIG. 11.

Figure 9:
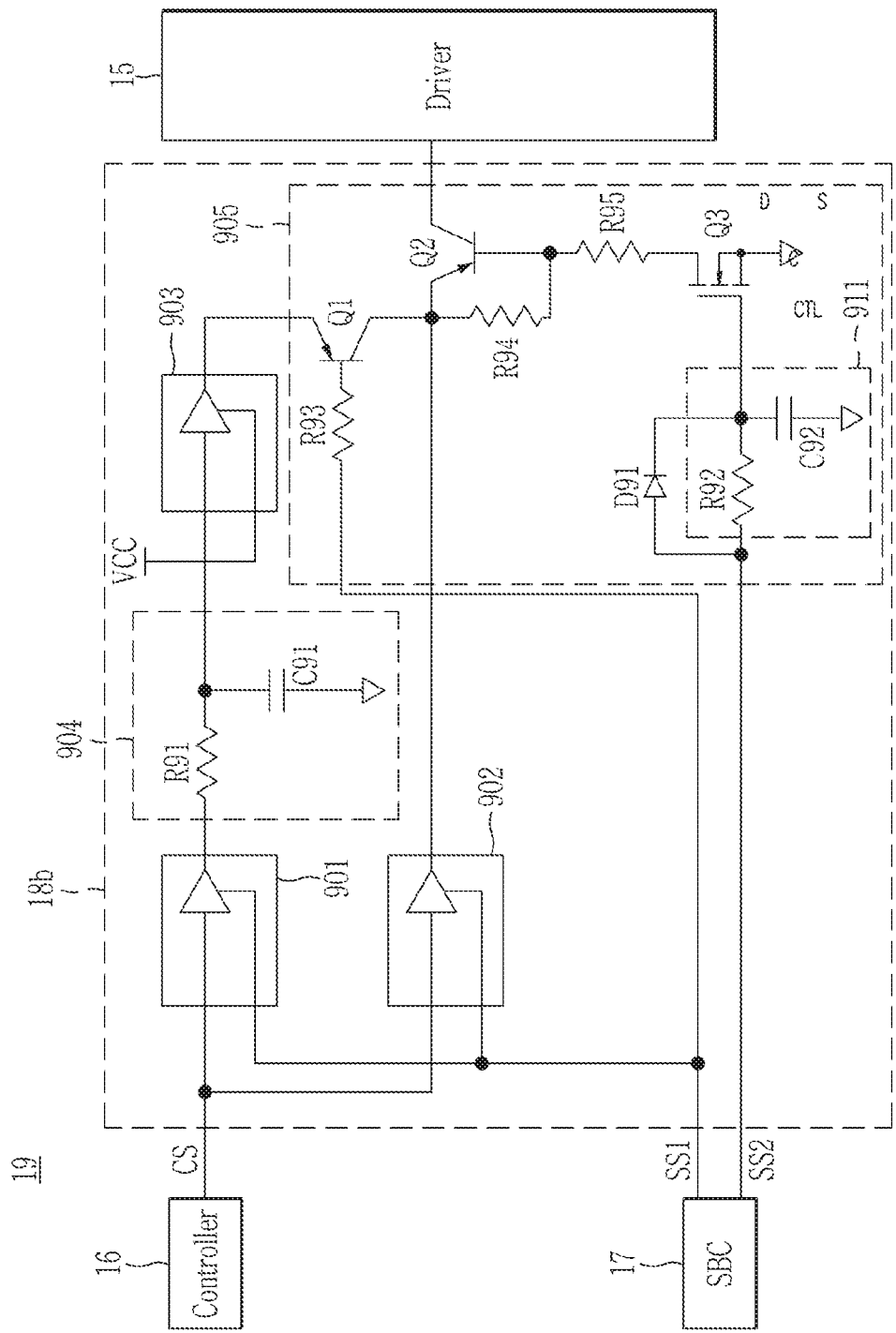
FIG. 9 schematically illustrates a switch control circuit according to a second embodiment of the described technology.

FIG. 9 schematically illustrates a switch control circuit 19 according to the second embodiment.

Referring to FIG. 9, the switch control circuit according to the second embodiment includes the driver 15, the controller 16, the SBC 17, and a buffer circuit 18b. The buffer circuit 18b corresponds to the buffer circuit 18 of FIG. 1, and may include a plurality of buffers 901, 902, and 903, a holding circuit 904, and a switch circuit 905.

Each of the buffers 901, 902, and 903 may be a 3-state buffer identical to the first and second buffers 201 and 202 described with reference to FIG. 2 and FIG. 3. That is, each of the buffers 901, 902, and 903 may output the output signal corresponding to the control signal applied to the input terminal to the output terminal, or may change the output terminal to the open state, depending on a signal applied to the enable terminal.

Each of the first and second buffers 901 and 902 may include an enable terminal to which the safety signal SS1 is input and applied from the SBC 17, an input terminal into which the control signal CS is input from the controller 16, and an output terminal which outputs the output signal to the holding circuit 904. Accordingly, the first and second buffers 901 and 902 may be enabled to output the output signal corresponding to the safety signal SS1 to the holding circuit 904 when the safety signal SS1 has the high-level, and may be disabled to change the output terminal to the open state when the safety signal has the low-level.

The third buffer 903 may include an enable terminal to which the VCC voltage is applied, an input terminal connected to the holding circuit 904, and an output terminal for outputting the output signal to the switch circuit 905. Accordingly, the third buffer 903 may always be enabled, and the output signal corresponding to a signal input from the holding circuit 904 may be output to the switch circuit 905.

The holding circuit 904 may serve to hold a previous state of a signal applied to the input terminal of the third buffer 903 during a predetermined time when the output terminal of the first buffer 901 is switched to the open state. The holding circuit 904 may be configured to include an RC circuit, and may include a resistor R91 connected between the output terminal of the first buffer 901 and the input terminal of the third buffer 903, and a capacitor C91 connected between the input terminal of the third buffer 903 and the ground.

When the output terminal of the first buffer 901 is switched to the open state, the capacitor C21 of the holding circuit 904 may be delayed so that the state of the control signal input into the input terminal of the third buffer 903 is gradually changed through charging and discharging. For example, when the output terminal of the first buffer 901 outputs a high-level signal and is then switched to the open state, the holding circuit 904 may hold the control signal input into the input terminal of the third buffer 903 at the high-level for a predetermined time. For example, when the output terminal of the first buffer 901 outputs a low-level signal and then is switched to the open state, the holding circuit 904 may hold the control signal input into the input terminal of the third buffer 903 at the low-level for a predetermined time.

A time during which the holding circuit 904 holds the level of the control signal input into the input terminal of the third buffer 903 to the previous state when the output terminal of the first buffer 901 is switched to the open state may be adjusted depending on RC time constants of the resistor R91 and the capacitor C91 constituting the holding circuit 904, and the time constants may vary depending on capacitances of the resistor R91 and the capacitor C91.

The switch circuit 905 may serve to transfer the output of the second buffer 902 or the third buffer 903 to the driver 15 depending on the safety signals SS1 and SS2 output from the SBC 17. The switch circuit 905 may include a plurality of switches Q1, Q2, and Q3, and a delay circuit 911.

The first switch Q1 includes a first terminal connected to the output terminal of the third buffer 903, a second terminal connected to the first terminal of the second switch Q2, and a control terminal into which the safety signal SS1 is input from the SBC 17, and a resistor R93 may be connected between the control terminal of the first switch Q1 and the SBC 17.

The first switch Q1 may electrically connect the output terminal of the third buffer 903 and the second switch Q2 or disconnect them depending on the safety signal applied from the SBC 17. For example, referring to FIG. 9, the first switch Q1 may be a PNP transistor. In this case, the first terminal, the second terminal, and the control terminal of the first switch Q1 may be referred to as emitter, collector, and base terminals, respectively, and the first terminal may be electrically connected with the second electrode when the safety signal SS1 applied to the control terminal has the low-level.

The second switch Q2 includes a first terminal connected to the output terminal of the second buffer 902 and the second terminal of the first switch Q1, a second terminal connected to the driver 15, and a control terminal connected to a first terminal of the third switch Q3 through a resistor R95, and a resistor R94 may be connected between the first terminal and the control terminal of the second switch Q2.

The second switch Q2 may transfer the output signal of the third buffer 903 or the second buffer 902 transferred through the first switch Q1 to the driver 15 depending on a voltage applied to the first terminal of the third switch Q3. For example, as shown in FIG. 9, the second switch Q2 may be a PNP transistor. In this case, the first terminal, the second terminal, and the control terminal of the second switch Q2 may be referred to as emitter, collector, and base terminals, respectively, and the first terminal may be electrically connected with the second electrode when the voltage applied from the first terminal of the third switch Q3 has the low-level.

The third switch Q3 includes a first terminal connected to the control terminal of the second switch Q2, a second terminal connected to the ground, and a control terminal to which the safety signal SS2 is applied from the SBC 17.

The third switch Q3 may turn the second switch Q2 on or off by switching the voltage applied to the control terminal of second switch Q2 depending on the safety signal SS2 applied from SBC17. For example, as shown in FIG. 9, the third switch Q3 may be an N-channel field effect transistor (FET). In this case, the first terminal, the second terminal, and the control terminal of the second switch Q3 may be referred to as drain, source, and gate terminals, respectively, and the first terminal may be electrically connected with the second electrode when the safety signal SS2 applied to the control terminal has the high-level. That is, when the safety signal SS2 applied to the control terminal has the high-level, the third switch Q3 may turn on the second switch Q2 by connecting the first terminal to the ground.

A delay circuit 911 may be connected between the third switch Q3 and the SBC 17.

When the safety signal SS2 is changed from the high-level to the low-level, the delay circuit 911 may serve to delay a time point at which the third switch Q3 is turned off by delaying level change of the safety signal SS2 applied to the control terminal by a predetermined time. The delay circuit 911 may be configured to include an RC circuit, and may include a resistor R92 connected between the SBC 17 and the input terminal of the third switch Q3, and a capacitor C92 connected between the control terminal of the third switch Q3 and the ground.

When the safety signal SS2 is changed from the high-level to the low-level due to the fault of the controller 16, the capacitor C92 of the delay circuit 911 may delay a state of the control signal input into the control terminal of the third switch Q3 to gradually change from the high-level to the low-level through charging and discharging. Accordingly, the third switch Q3 may be changed from the high-level to the low-level, and the third switch Q3 may be turned off after a predetermined time.

A time during which the turn-off of the third switch Q3 is delayed when the safety signal SS2 is changed from the high-level to the low-level may be adjusted depending on RC time constants of the resistor R92 and the capacitor C92 constituting the delay circuit 911, and the RC time constants may vary depending on capacitances of the resistor R92 and the capacitor C92.

A diode D91 may be coupled in parallel to the resistor R92 constituting the delay circuit 911. That is, the diode D91 may have an anode connected to the SBC 17 and a cathode connected to the control terminal of the third switch Q3. When the control signal SS2 is changed from the low-level to the high-level, the diode S91 may prevent switching (turn-off→turn-on) of the third switch Q3 from being delayed by the delay circuit 911. In other words, when the safety signal SS2 is changed from the low-level to the high-level, the safety signal SS2 may be transferred to the control terminal of the third switch Q3 by the diode D91 instead of the delay circuit 911, to prevent the switching (turn-off→turn-on) of the third switch Q3 from being delayed by the delay circuit 911.

Hereinafter, the operation of the switch control circuit 19 according to the second embodiment will be described in detail with reference to FIG. 10 and FIG. 11.

FIG. 10 illustrates a view for describing an operating method in a state where a controller operates normally in the switch control circuit 19 according to the second embodiment.

Referring to FIG. 10, the safety signal SS1 output from the SBC 17 is held at the high-level in a state in which the controller 16 operates normally.

When the control signal SS1 has the high-level, the first and second buffers 901 and 902 are enabled to output an output signal in response to the control signal CS input from the controller 16. For example, when the control signal CS of the low-level is input from the controller 16 in a state where the safety signal SS1 has the high-level, both of the first and second buffers 901 and 902 output the output signal of the low-level (ground voltage) to the output terminal 313. For example, when the control signal CS of the high-level is input from the controller 16 in a state where the safety signal SS1 has the high-level, both of the first and second buffers 901 and 902 output the output signal of the high-level (VCC voltage) to the output terminal.

In a state where the safety signal SS1 has the high-level, the output signal of the first buffer 901 is transferred to the input terminal of the third buffer 903 through the holding circuit 904, and the output signal of the second buffer 902 is transferred to the first terminal of the second switch Q2. Since the third buffer 203 is always in an enabled state regardless of the safety signal SS1, when the output signal of the first buffer 901 transferred through the holding circuit 904 is input, the output signal corresponding thereto is transferred to the first terminal of the first switch Q1.

The first switch is maintained to be turned off in a state where the safety signal SS1 has the high-level. Accordingly, only the output signal of the second buffer 902 may be transferred to the first terminal of the second switch Q2.

The safety signal SS2 output from the SBC 17 holds the high-level while the controller 16 is operating normally, similar to the control signal SS1.

The third switch Q3 is maintained to be turned on while the safety signal SS2 has the high-level, and thus the ground voltage is applied to the control terminal of the second switch Q2 to turn on the second switch Q2. As the second switch Q2 is turned on, the first and second terminals of the second switch Q2 are electrically connected, so that the control signal CS output from the controller 16 is transmitted to the driver 15 through the second buffer 902 and the second switch Q2.

FIG. 11 illustrates a view for describing an operating method in a state where the controller is faulty in the switch control circuit 19 according to the second embodiment.

Referring to FIG. 11, the SBC 17 changes the safety signal SS1 from the high-level to the low-level (time point t21) as the fault of the controller 16 is detected.

The first and second buffers 901 and 902 are disabled to switch the output terminal to the open state regardless of the control signal CS of the controller 16 as the safety signal SS1 is changed from the high-level to the low-level.

The control signal CS output from the controller 16 before the fault occurs has the high-level, and thus the output signal of the first buffer 901 before the fault occurs also has the high-level. Therefore, the holding circuit 904 may hold the level of the signal input into the input terminal of the third buffer 903 at a high-level by discharging a charge stored in the capacitor C21 during a normal operation, for a predetermined time after the first buffer 901 is disabled. Accordingly, the third buffer 903 may output the output signal of the high-level for the predetermined time (a period t21 to t23).

When the control signal SS1 has the low-level, the first switch Q1 is switched to the turn-on state to transfer the output signal of the third buffer 903 to the first terminal of the second switch Q2. Since the output terminal of the second buffer 902 is in the open state when the safety signal SS1 has the low-level, only the output signal of the third buffer 903 is applied to the first terminal of the second switch Q2.

When the fault of the controller 16 is detected, the SBC 17 changes the control signal SS1 to the low-level, and then changes the control signal SS2 to the low-level after a predetermined period (t21 to t22). When the control signal SS2 is changed from the high-level to the low-level, the third switch Q3 is turned off, whereby the second switch Q2 is also turned off.

Since the safety control SS1 is changed to the low-level and then the safety signal SS2 is changed to the low-level after a predetermined time, the safety signal SS1 is changed to the low-level to turn on the first switch Q1, and then the second switch Q2 is turned off after the predetermined time. Accordingly, the second switch Q2 may transfer the output signal of the third buffer 903 to the driver 15 for the predetermined time after the safety signal SS1 is changed to the low-level.

In the switch circuit 905 of FIG. 9, a time point at which the safety signal SS2 is changed from the high-level to the low-level, and then the third switch Q3 and the second switch Q2 are turned off, may be delayed by the delay circuit 911.

As described above, in the second embodiment, a time during which the third buffer 903 holds the output signal at the high-level in a state where the safety signal is changed from the high-level to the low-level may be adjusted by adjusting an RC time constant of the holding circuit 904. In addition, a time between a time point (t22) at which the safety signal SS2 is changed from the high-level to the low-level and a time point (t24) at which the third switch Q3 and the second switch Q2 are turned off may be adjusted by adjusting an RC time constant of the delay circuit 911. Therefore, in the switch control circuit 19 according to the second embodiment, a time during which the control signal input into the driver 15 when the controller 16 develops a fault is maintained at the level before the fault occurs may be adjusted by adjusting the RC time constants of the holding circuit 904 and the delay circuit 911.

It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures can be combined, interchanged, or excluded from other embodiments.

While certain embodiments of the described technology have been particularly shown and described with reference to the accompanying drawings, the specific terms used herein are only for the purpose of describing the embodiments and are not intended to define the meanings thereof or be limiting of the scope of the invention set forth in the claims. Therefore, those skilled in the art will understand that various modifications and other equivalent embodiments of the described technology are possible. Consequently, the true technical protective scope of the described technology must be determined based on the technical spirit of the appended claims.

What is claimed is:

1. A switch control circuit comprising:
a driver configured to control switching of a high voltage switch;
a first controller configured to output a first control signal for controlling the driver;
a second controller electrically connected to the first controller and configured to detect a fault of the first controller and to output a second control signal in response to detecting the fault of the first controller;
a first buffer, a second buffer and a third buffer each configured to output an output signal, via an output terminal thereof, corresponding to the first control signal or change the respective output terminal to an open state in response to the second control signal;
a holding circuit including a resistor connected between the output terminal of the first buffer and an input terminal of the third buffer and a capacitor connected between the input terminal of the third buffer and ground, the holding circuit configured to cause the first control signal, which was previously output from the first buffer, to be input to the third buffer for a predetermined time in response to the output terminal of the first buffer being switched to the open state due to the fault of the first controller; and
a switch circuit configured to transfer the output signal of the second buffer or the output signal of the third buffer to the driver in response to the second control signal.

2. The switch control circuit of claim 1, wherein:
the second controller is configured to hold the second control signal at a first level when the first controller is operating normally, and change the second control signal to a second level different from the first level when a fault of the first controller is detected; and
the first buffer and the second buffer are three-state buffers, each of which includes an enable terminal to which the second control signal is applied, an input terminal to which the first control signal is applied, and the output terminal thereof to output the output signal corresponding to the first control signal when the second control signal has the first level and to change the output terminal of each of the first and second buffers to an open state when the second control signal has the second level.

3. The switch control circuit of claim 2, wherein:
the third buffer is a three-state buffer including an enable terminal to which the second control signal is applied, the input terminal connected to the resistor, and the output terminal thereof connected to the switch circuit, to output the output signal corresponding to an input signal of the third buffer when the second control signal has the second level and to change the output terminal of the third buffer to an open state when the second control signal has the first level.

4. The switch control circuit of claim 2, wherein:
the switch circuit includes a switch including (i) a first terminal connected to the driver, (ii) a second terminal connected to the output terminal of the second buffer, (iii) a third terminal connected to the output terminal of the third buffer, and (iv) a control terminal to which the second control signal is applied, and
the switch is configured to connect the first terminal to the second terminal when the second control signal has the first level, and connect the first terminal to the third terminal when the second control signal has the second level.

5. The switch control circuit of claim 2, wherein:
the second controller is configured to output a third control signal in response to a fault detection result of the first controller, and change the third control signal to the second level at a predetermined time after the second control signal is changed to the second level when the fault of the first controller is detected.

6. The switch control circuit of claim 5, wherein the switch circuit includes:
a first switch configured to include a first terminal connected to the output terminal of the third buffer, a second terminal, and a control terminal to which the second control signal is applied, the first switch configured to be turned on when the second control signal has the second level; and
a second switch including a first terminal connected to the output terminal of the second buffer and the second terminal of the first switch, and a second terminal connected to the driver, the second switch configured to be turned on in response to the third control signal.

7. The switch control circuit of claim 6, wherein:
the switch circuit further includes a third switch including a first terminal connected to the control terminal of the second switch, a second terminal connected to the ground, and a control terminal, to connect the first terminal and the ground in response to the third control signal.

8. The switch control circuit of claim 7, wherein:
the switch circuit further includes a delay circuit connected between the control terminal of the third switch and the second controller to transfer the third control signal, and
the delay circuit includes a resistor connected between the second controller and the control terminal of the third switch, and a capacitor connected between the control terminal of the third switch and the ground.

9. The switch control circuit of claim 8, wherein:
the switch circuit further includes a diode including an anode connected to the second controller and a cathode connected to a control terminal of the third switch.

10. The switch control circuit of claim 1, wherein:
the third buffer is configured to output the output signal thereof corresponding to the input signal of the third buffer input through the holding circuit.

11. A battery pack comprising:
a battery module;
a high voltage switch connected between the battery module and an external device to control a current flow between the battery module and the external device;
a driver configured to control switching of the high voltage switch;
a first controller configured to output a first control signal for controlling the driver;
a second controller electrically connected to the first controller and configured to detect a fault of the first controller and to output a second control signal in response to detecting the fault of the first controller;
a first buffer, a second buffer and a third buffer each configured to output an output signal, via an output terminal thereof, corresponding to the first control signal or change the respective output terminal to an open state in response to the second control signal;
a holding circuit including a resistor connected between the output terminal of the first buffer and an input terminal of the third buffer and a capacitor connected between the input terminal of the third buffer and ground, the holding circuit configured to cause the first control signal, which was previously output from the first buffer, to be input to the third buffer for a predetermined time in response to the output terminal of the first buffer being switched to the open state due to the fault of the first controller; and
a switch circuit configured to transfer the output signal of the second buffer or the output signal of the third buffer to the driver in response to the second control signal.

12. The battery pack of claim 11, wherein:
the second controller is configured to hold the second control signal at a first level when the first controller is operating normally and change the second control signal to a second level when a fault of the first controller is detected; and
the first buffer and the second buffer are three-state buffers, each of which includes an enable terminal to which the second control signal is applied, and an input terminal to which the first control signal is applied, and the output terminal thereof to output the output signal corresponding to the first control signal when the second control signal has the first level and to change the output terminal of each of the first and second buffers to an open state when the second control signal has the second level.

13. The battery pack of claim 12, wherein:
the third buffer is a three-state buffer including an enable terminal to which the second control signal is applied, an input terminal connected to the resistor, and the output terminal thereof connected to the switch circuit, to output the output signal corresponding to an input signal of the third buffer when the second control signal has the second level and to change the output terminal of the third buffer to an open state when the second control signal has the first level.

14. The battery pack of claim 11, wherein the switch circuit includes:
a first switch including a first terminal connected to the output terminal of the third buffer, a second terminal, and a control terminal to which the second control signal is applied, the first switch configured to be turned on when the second control signal has the second level;
a second switch including a first terminal connected to the output terminal of the second buffer and the second terminal of the first switch, a second terminal connected to the driver, and a control terminal; and
a third switch including a first terminal connected to the control terminal of the second switch, a second terminal connected to the ground, and a control terminal, to connect the first terminal and the ground in response to a third control signal.

15. The battery pack of claim 14, wherein the switch circuit further includes:
a delay circuit including a resistor connected between the second controller and the control terminal of the third switch, and a capacitor connected between the control terminal of the third switch and the ground; and
a diode including an anode connected to the second controller and a cathode connected to a control terminal of the third switch.

16. A battery pack comprising:
a battery module;
a high voltage switch connected between the battery module and an external device to control a current flow between the battery module and the external device;
a driver configured to control switching of the high voltage switch;
a main controller configured to output a first control signal for controlling the driver;
an auxiliary controller electrically connected to the main controller and configured to detect a fault of the main controller and to output a second control signal in response to detecting the fault of the main controller;
at least two buffers comprising a holding circuit input buffer and a holding circuit output buffer each configured to output an output signal, via an output terminal thereof, corresponding to the first control signal or change the respective output terminal to an open state in response to the second control signal;
a holding circuit connected between the output terminal of the holding circuit input buffer and an input terminal of the holding circuit output buffer and configured to hold a previous state of an input signal of the holding circuit output buffer during a predetermined time when the output terminal of the holding circuit input buffer is switched to the open state; and
a switch circuit configured to transfer the output signal of the holding circuit output buffer to the driver.

17. The battery pack of claim 16, wherein the holding circuit includes a resistor connected between the output terminal of the holding circuit input buffer and the output terminal of the holding circuit output buffer and a capacitor connected between an input terminal of the holding circuit output buffer and ground.

18. The battery pack of claim 16, further comprising a holding circuit bypass buffer configured to output an output signal, via an output terminal thereof, corresponding to the first control signal or change the output terminal of the holding circuit bypass buffer to an open state in response to the second control signal, wherein the switch circuit is configured to transfer the output signal of the holding circuit bypass buffer or the output signal of the holding circuit output buffer to the driver in response to the second control signal.

* * * * *